United States Patent Office 3,230,731
Patented Jan. 25, 1966

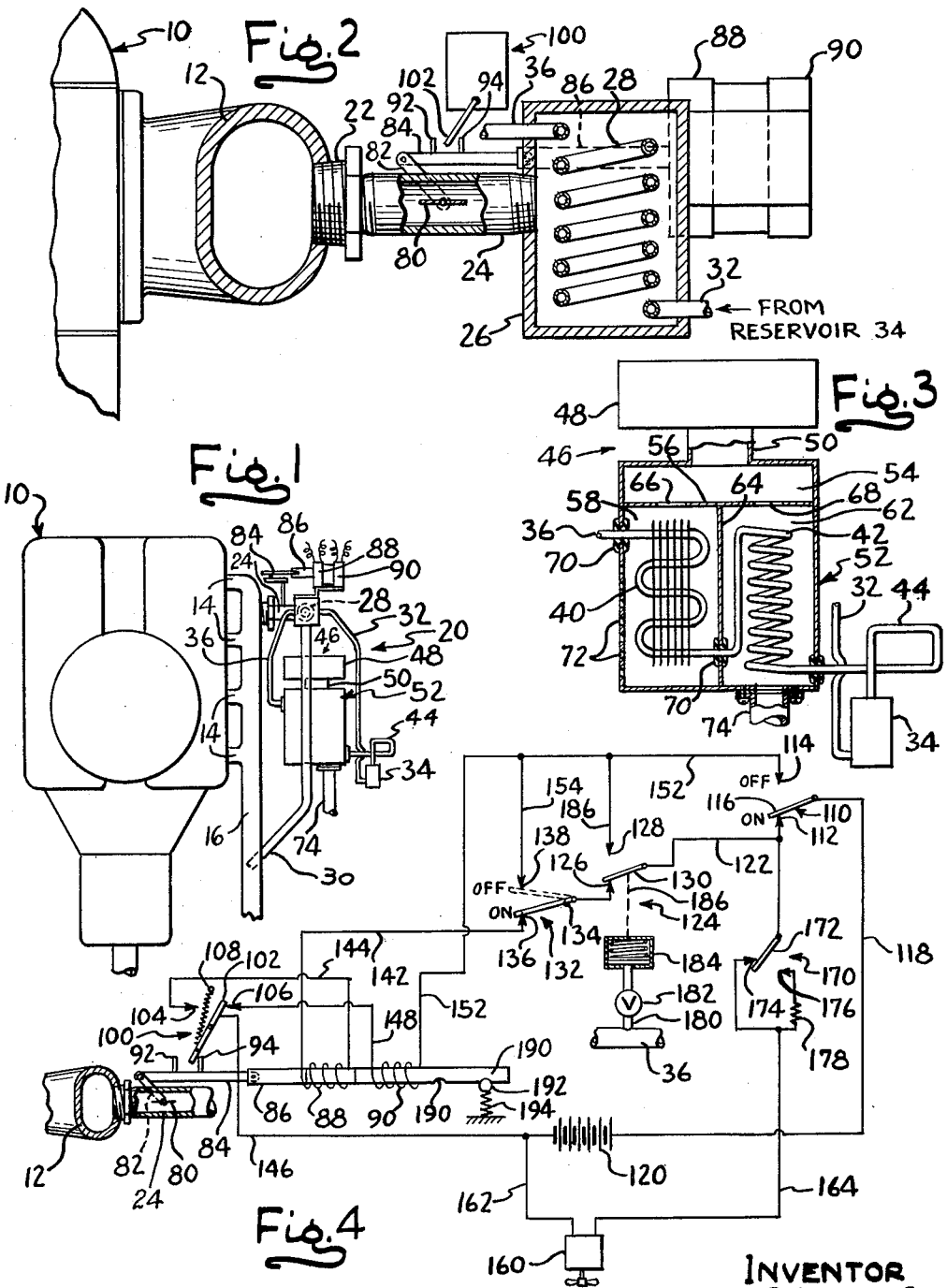

3,230,731
AIR COOLING SYSTEM FOR AUTOMOBILES
Roy J. Hess, Jr., Chicago, Ill., assignor of fifty percent to Lester Thomas, Chicago, Ill.
Filed July 16, 1964, Ser. No. 383,131
5 Claims. (Cl. 62—238)

The present invention relates to an improved system for automatically supplying cooled air to the interior of a motor vehicle to maintain a preselected temperature condition therein. In particular, the present invention relates to an improved air cooling system for an automotive vehicle wherein an automatically controlled absorption refrigeration unit using the heat of the exhaust gases thereof as the main source of energy therefor is employed as the means for cooling air to the desired temperature. Units of this type use heat to vaporize and pressurize the coolant material so that the gas can be condensed at modest temperatures. These units do not require the use of a compressor to pressurize the gas.

The absorption air conditioning system has not been used in motor vehicles much, if at all, although it has been proposed for such purpose wherein the heat of the exhaust gases is used as the heat source required to operate the same. The reason for their lack of use in motor vehicles is probably that the prior proposed system did not utilize the heat from the exhaust gases in an efficient manner and control of the cooling temperature left much to be desired. For example, in a number of these proposed systems the source of heat was the exhaust gases passing through the tail pipe of the vehicle. A coil containing the refrigerant was passed around a section of the tail pipe where the refrigerant pressure is raised by the heat passing first through the tail pipe walls and then through the coil walls. So far as is known, such systems relied for their operation on manual controls and no provision was made for automatically controlling the cooling temperatures.

The most widely used of the present day methods of achieving air cooling in a motor vehicle uses a compressor, such air cooling system being sometimes referred to as a vapor-compression system. In such a system, the compressor is mechanically coupled to the drive shaft of the automobile through a belt and solenoid operated clutch. The compressor is used to raise the pressure of the refrigerant to enable the same to be condensed at a modest temperature. Control over the cooling temperature is effected by a thermostat which controls the clutch solenoid to drive the compressor when cooling is demanded and de-energize the clutch solenoid to stop the compressor when cooling is not required to satisfy the thermostat. The heavy electrical demands of this air conditioning system require a special heavy duty battery and generator and the power demands of the compressor on the engine result in low mileage per gallon.

Accordingly, it is an object of the present invention to provide an air cooling system for motor vehicles which employs an absorption refrigeration unit which uses the heat of exhaust gases in a more efficient manner than in motor vehicle air cooling systems of this type heretofore proposed. A related object of the present invention is to provide a motor vehicle air cooling system as described where the air temperature is automatically controlled.

It is also an object of the present invention to provide an air cooling system of the type described which places minimum demands on the electrical and mechanical portions of the motor vehicle. It is a further object of the present invention to provide an air cooling system for a motor vehicle which is extremely compact in construction and which, if desired, can be installed in practically any motor vehicle.

The preferred form of air cooling unit of the present invention utilizes directly the exhaust gases at their maximum temperatures to vaporize the refrigerant within the system. To this end, part of the exhaust gases of the exhaust manifold are diverted and caused to flow directly around the refrigerant containing pressurizing coils preferably positioned near the manifold. The diverted exhaust manifold gases are then channeled back into the exhaust system of the motor vehicle for exhaust to the atmosphere in the conventional manner. A valve is placed in the exhaust gas diverting line between the exhaust manifold and the pressurizing coils which valve is automatically controlled by a unique electrical system associated with the unit which places practically no drain on the battery of the motor vehicle so that a heavy duty battery and generator need not be used. The electrical system serves to control the flow of exhaust gases around the pressurizing coils in accordance with a preselected setting made by the operator of the vehicle. The valve is most desirably either fully opened or fully closed in a manner to be described so that the average cooling performed by the system is a function of the ratio of the average opened to closed time of the valve. The electrical system is so designed that it will act reliably under all operation conditions. The motor vehicle cooling system of the invention operates with normal exhaust gas temperatures and places no special demands on the automobile engine. Thus, the present invention can be added to any standard motor vehicle using internal combustion engines and without reducing gas mileage as in the case of the air conditioning system now in common usage in motor vehicles.

These and other objects, advantages and features of this invention will become apparent upon making reference to the specification, claims and drawings wherein:

FIG. 1 is a top plan view of an embodiment of the present invention illustrating the relationship between the motor of a vehicle and an absorption-type refrigeration unit;

FIG. 2 is an enlarged fragmentary vertical sectional view of FIG. 1;

FIG. 3 is an enlarged view partly in section of the air-intake and cooling assembly of said absorption-type refrigeration unit; and FIG. 4 is an electrical circuit diagram of the control circuit for the cooling system of FIG. 1.

Referring now in particular to the drawings, there is shown in FIG. 1 an internal combustion engine 10 of conventional design having an exhaust manifold 12. The manifold 12 includes a number of short conduits 14 which direct exhaust fuel gases from the engine into a collector tube 16 which in turn is connected to a tail pipe (not shown) for venting the exhaust gases to atmosphere. In achieving the objectives of the present invention, a portion of the exhaust gases formed in the engine 10 are utilized for operating an absorption-type refrigeration unit designated generally at 20. To this end, a direct tap into the manifold 12 is made and a bushing 22 is secured in the opening thus formed. A conduit 24 is joined at its inlet end to the bushing 22 and at its outlet end to a generator 26 of the absorption-type refrigeration unit 20. The generator 26 comprises a pressurizing coil 28 containing a refrigerant to be vaporized by heat from the exhaust gases passing from the exhaust manifold 12 through the conduit 24. The portion of the exhaust gases which is utilized to vaporize the refrigerant advantageously is channelled back into the exhaust system of the vehicle by an exhaust gas return conduit 30 which enters the collector tube 16 at a point downstream from the last engine exhaust port. The outlet end of the conduit 30 desirably is externally threaded to enable it to be secured in gas tight engagement in a tapped opening in the collector tube and enters the tube at an angle such that exhaust gases passing from the conduit 30 into the tube 16 will be drawn thereinto by the main stream of exhaust gases flowing toward the tail pipe of the vehicle.

The lower end of the coil 28 is joined by a conduit 32 to a reservoir 34 for a refrigerant in the refrigeration unit 20. The upper end of the coil 28, as illustrated, is joined to a conduit 36 which conveys refrigerant vaporized in the coil 28 to a condenser 40 comprising a finned tube. The condenser 40, in turn, is joined to an evaporator coil 42 which is in communication with the reservoir 34 through an absorber coil 44.

In the embodiment of the invention illustrated, the condenser 40 and the evaporator coil 42 desirably are incorporated in an air intake unit 46. The unit 46 comprises an air filter containing head portion 48 having a neck portion 50 in communication with a compartmented body portion 52. The body portion 52 at its forward end has a filtered air chamber 54 formed by a transverse wall 56, and a condenser chamber 58 and an evaporator coil chamber 62 formed by a longitudinally extending wall 64. The chamber 54 communicates with chambers 58 and 62 through openings 66 and 68, respectively, in the wall 56. Sealing gaskets 70 desirably are provided at the entry point of the conduit 36 into the chamber 58 and the exit point of the chamber 62, as well as, at the point in the wall 64 where the condenser 40 and the evaporator coil 42 merge. The chamber 58 is vented to atmosphere by openings 72, while the chamber 62 is joined at its rear wall to a cooled air conduit 74 which may be connected to the usual outlets provided for the heater of the vehicle or to separate ducts provided for the purpose of distributing the cooled air to the interior of the vehicle.

The operation of the refrigeration unit 20 is well known in the art and has been briefly alluded to in the introductory portion of the present description. Basically, the operation of the unit involves simultaneously vaporizing and pressurizing a liquid refrigerant in the pressurizing coil 28. In the present instance, this result is achieved by causing a portion of the heated exhaust gases from the manifold 12 to be diverted through conduit 24 into direct contact with the coil 28. Heat from the exhaust gases passes through the wall of the coil 28 and vaporizes the refrigerant. The vaporized refrigerant travels into the condenser 40 where it loses its heat to air from chamber 54 of the air intake unit 46. In the condenser 40 the refrigerant becomes liquid and undergoes a marked reduction in temperature. The liquid refrigerant passes into the evaporator coil 42 where it expands into a gas which absorbs heat from the air in the chamber 62. The refrigerant then passes by gravity into the absorber coil 44 where the refrigerant liquifies and collects in the reservoir 34.

The refrigeration unit of the present invention especially desirably utilizes an ammonia solution and hydrogen gas as the refrigerant. However, other well known refrigerants such as lithium bromide can be used. In the unit described, water is employed as the absorbent. Refrigeration units operating on the principles hereinabove described are available commercially under, among others, the trade designation Bernz-O-Matic.

In achieving the objectives of the present invention, a valve 80 most advantageously is provided in the exhaust gas conduit 24 for controlling the flow of exhaust gases from the manifold 12 to the pressurizing coil 28 of the refrigeration unit. The exhaust gas control valve 80 desirably is of the butterfly type and is operable by means of a pivotal link 82 connected to an extension 84 of an armature 86 operatively positioned with respect to an "on" solenoid 88 and an "off" solenoid 90. The valve 80 advantageously is moved to a "closed" or an "open" position by means of a pair of spaced studs or pins 92 and 94 on the armature 86. The pins 92 and 94 in turn serve to actuate a switch 100 of the single pole, double-throw snap type which has two stable positions where the pole or movable contact 102 thereof is spring urged respectively against stationary contacts 104 and 106. A spring 108 serves to move the contact 102 into engagement with contacts 104 and 106 when the contact 102 has been moved to the half way point of its stroke by the pins 92 or 94 in a manner to be described.

The operation of the air cooling system of the present invention is controlled in a unique manner by an electrical system which comprises a main on-off switch 110 which advantageously is positioned at the dashboard of the vehicle within convenient reach of the operator. The switch 110 may be the ignition switch of the automobile or a separate switch which is automatically switched to its "off" position when the ignition switch is turned off. The switch 110 has two stationary contacts 112 and 114 and a movable contact 116, and is connected by conductor 118 to the battery 120 of the vehicle. In the "on" position, that is, when contacts 112 and 116 are engaged, the switch 110 is joined through a conductor 122 to a pressure switch 124 having a pair of stationary contacts 126 and 128, and a movable contact 130. The operation of the pressure switch 124 will be described in detail hereafter. The switch 124, when the contacts 126 and 130 are engaged, is connected to a thermostat 132 having a heat responsive bimetallic element 134 which makes contact with a stationary contact 136 when the thermostat is in the "on" or cooling position and with a stationary contact 138 when it is in the "off" or non-cooling position. The thermostat 132 in its "on" position is joined by a conductor 142 to "on" solenoid 88 which, in turn, is connected by a conductor 144 to the stationary contact 104 of the snap switch 100. The movable contact 102 of the switch is joined by a conductor 146 to the battery 120 to complete the circuit. In this connection, it should be pointed out that energization of the solenoid 88 through the circuit just described is only momentary. This momentary energization of the solenoid 88 causes the armature 86 to move to the left as viewed in FIG. 4 of the drawing. As the armature 86 moves, the pin 94 on the extension 84 thereof engages the movable contact 102 of the switch 100, disengaging it from stationary contact 104 and carrying it to a position where the spring 108 takes over and brings the contact 102 into engagement with the stationary contact 106. In this position, the circuit to the battery 120 is broken and the switch 100 is automatically connected through a conductor 148 to the "off" solenoid 90. The valve 80, as a result of the movement of the armature 86, is mechanically moved by means of the extension 84 and the arm 82, to a fully opened position in the conduit 24. In this position, exhaust gases from the manifold 12 are diverted to the pressurizing coil 28 to thereby activate the refrigeration system 20.

The solenoid 90 is joined by a conductor 152 to the stationary or "off" contact 138 of the thermostat 132. When the interior of the vehicle has been cooled to a temperature preselected on the thermostat by the operator of the vehicle, the bimetallic element 134 will engage the stationary or "off" contact 138 of the thermostat which is connected by a conductor 154 to the conductor 152. This momentarily completes a circuit through the "off" solenoid 90, the engaged contacts 102 and 106 of the switch 100, and the battery 120. Energization of the solenoid 90 in this manner causes the armature 86 to move to the right, as viewed in FIG. 4, which movement brings the pin 92 into engagement with the contact 102. The spring 108, as before, then completes the stroke of the contact 102 whereby it is brought into engagement with the stationary contact 104. In this position, the circuit to the battery 120 is broken and switch 100 is thus automatically reset to satisfy a demand for cool air in the interior of the vehicle. The valve 80, due to the shift in position of the armature will now be in a fully closed position, preventing the flow of exhaust gases to the pressurizing coil 28. The non-cooling condition of the cooling system of the present invention just described will prevail when the main switch 110 is in the "off" position, that is, when movable contact 110 is engaged with stationary contact 114 to complete a circuit through conductor 152 to the "off" solenoid 90.

A fan 160 is connected by a conductor 162 the conductor 146 which is joined to the battery 120 and the movable contact 102 of the switch 100, and to the main switch 110 by a conductor 164 through a fan switch 170 having high and low fan speed positions. The switch 170 desirably is of the manually operated, single pole, double-throw type having a movable contact 172 and stationary contacts 174 and 176. The contact 174 is connected directly to the conductor 164 while the contact 176 is connected to the conductor 164 through a resistor 178. By bringing the movable contact 172 into engagement with either the contact 174 or the contact 176, the fan 160 can be made to operate at a high or low speed, respectively, in accordance with the desires of the operator.

As indicated hereinabove, a pressure switch 124 is provided for the system to prevent build-up of excessive pressures in the refrigeration unit 20. Such a switch can be connected to the unit 20 by tapping into a convenient conduit thereof, for example, conduit 36, with a conduit 180. A valve 182 is provided for the conduit 180 and can be manually controlled to stop flow in the conduit 180. The conduit 180, at its outlet end, is joined to a diaphragm 184 of the switch 124. The diaphragm carries an insulated bar or plunger rod 186 connected to the movable contact 130. The stationary contact 126 of the switch, as described above, is connected to the bimetallic element 134 of the thermostat 132. The stationary contact 128 of the switch 124, on the other hand, is connected by a conductor 186 to the conductor 152 joined to the "off" solenoid 90. In the event that an excessive pressure condition develops in the conduits of the refrigeration unit 20, pressure released through the valve 182 to the diaphragm 184 will cause the diaphragm to expand, moving the insulated plunger rod 184 to a position whereby the movable contact 130 will be brought into engagement with the stationary contact 128. The solenoid 90 will thereupon be momentarily energized causing the armature to move in a manner to cause the valve 80 in the conduit 24 to stop the flow of exhaust gases to the pressurizing coil 28. The system will thus remain inactive until the pressure condition in the refrigeration unit has been relieved, after which the movable contact 130 will re-engage stationary contact 126.

To prevent the armature 86 from being inadvertently jarred out of position with relation to the solenoids 88 and 90, the armature 86 advantageously is provided with spaced notches 190—190 for receiving a ball 192 biased thereagainst by a compression spring 194.

The control circuit utilized in the practice of the present invention, once set by the operator of the vehicle, is completely automatic in operation. The fool-proof, self-setting feature of the circuit places minimum drain on the battery. This aspect of the cooling system, in combination with the unique manner of utilizing directly the heat from the exhaust gases of the vehicle, provides a system for cooling the passenger-occupied portion of a motor vehicle which is highly efficient, economical, and effective. It should be understood that numerous modifications may be made in the preferred form of the invention above described without deviating from the broader aspects of the invention.

What is claimed is:

1. In combination with an internal combustion engine of a motor vehicle having a battery and an exhaust gas conduit extending from the engine for discharging hot exhaust gases, air cooling apparatus for the passenger-containing portion of the motor vehicle, the air cooling apparatus including an absorption-type refrigeration unit having a refrigerant containing portion with a pressurizing section where heat is to be absorbed to raise the pressure of the refrigerant in a gaseous state, and an air cooling section where the refrigerant absorbs heat from the medium to be cooled, and an air conduit which carries air past said air cooling section of the refrigerant containing portion of the refrigeration unit and into said passenger-containing portion of the motor vehicle, said refrigerant pressurizing section including a refrigerant-containing conduit having walls in direct contact with the hot exhaust gases passing through said exhaust gas conduit, wherein the heat in said exhaust gases passes through only the walls of the refrigerant-containing conduit to reach the refrigerant, and means responsive to the temperature of the air circulating in said passenger-containing portion of said motor vehicle for controlling the operation of said refrigeration unit to maintain a preselected temperature condition in the passenger-containing portion of said motor vehicle, said means including a main cooling control switch having a movable pole with a stable cooling "on" position and a stable non-cooling "off" position and first and second stationary contacts which are respectively engaged by said movable pole when said pole is in said cooling "on" and non-cooling "off" positions, a manually controlled switch including a movable pole which engages a contact for turning the air cooling apparatus to an "on" position from a normal "off" position, a first electrical control means for moving when momentarily energized the movable pole of said main cooling control switch to its stable cooling "on" position, a second electrical control means for moving when momentarily energized the movable pole of said main cooling control switch to its stable non-cooling "off" position, a thermostat having a heat responsive movable element with a stable cooling "on" position and a stable non-cooling "off" position and first and second stationary contacts which are respectively engaged by said movable element when said element is in said cooling "on" and non-cooling "off" positions, means for forming an energization circuit for said first electrical control means including in series circuit relation the movable pole and said contact of said manually controlled switch, the movable element and said first stationary contact of the thermostat, said first electrical control means, the movable pole and said first stationary contact of said main cooling control switch and the battery of the motor vehicle whereby said first electrical control means is momentarily energized by said battery to move the movable pole of said main control switch to its stable cooling "on" position in response to a demand for cool air by said thermostat, and means for forming an energization circuit for said second electrical control means including in series circuit relation the movable pole and said contact of said manually controlled switch, the movable element and said second stationary contact of the thermostat, said second electrical control means, the movable pole and said second stationary contact of said main cooling control switch and the battery of the motor vehicle whereby said second electrical control means is momentarily energized by said battery to move the movable pole of said main control switch to its stable non-cooling "off" position when said demand for cool air has been satisfied.

2. The combination of claim 1 where there is provided a valve for controlling the flow of exhaust gases by said refrigerant-containing conduit, said valve having two operative positions, a first position wherein said valve completely disconnects the flow of exhaust gases from said refrigerant-containing conduit and a second position where said valve allows the flow of exhaust gases to contact said conduit.

3. In a motor vehicle having a passenger-containing portion and a battery, air cooling apparatus for the passenger-containing portion of the motor vehicle, a main cooling control switch having a movable pole with a stable cooling "on" position and a stable non-cooling "off" position and first and second stationary contacts which are respectively engaged by said movable pole when said pole is in said cooling "on" and non-cooling "off" positions, a manually controlled switch including a movable pole which engages a contact for turning the air cooling apparatus to an "on" position from a normal "off" position, a first electrical control means for moving when momentarily energized the movable pole of said main cooling control switch to its stable cooling "on" position, a second electrical control means for moving when momentarily energized the movable pole of said main cooling control switch to its stable non-cooling "off" position, a thermostat having a heat responsive movable element with a stable cooling "on" position and a stable non-cooling "off" position and first and second stationary contacts which are respectively engaged by said movable element when said element is in said cooling "on" and non-cooling "off" positions, means for forming an energization circuit for said first electrical control means including in series circuit relation the movable pole and said contact of said manually controlled switch, the movable element and said first stationary contact of the thermostat, said first electrical control means, the movable pole and said first stationary contact of said main cooling control switch and the battery of the motor vehicle whereby said first electrical control means is momentarily energized by said battery to move the movable pole of said main control switch to its stable cooling "on" position in response to a demand for cool air by said thermostat, and means for forming an energization circuit for said second electrical control means including in series circuit relation the movable pole and said contact of said manually controlled switch, the movable element and said second stationary contact of the thermostat, said second electrical control means, the movable pole and said second stationary contact of said main cooling control switch and the battery of the motor vehicle whereby said second electrical control means is momentarily energized by said battery to move the movable pole of said main control switch to its stable non-cooling "off" position when said demand for cool air has been satisfied.

4. Air cooling apparatus for a motor vehicle as claimed in claim 3 wherein the manually controlled switch includes a second contact, and means for forming an energization circuit for said second electrical control means including the movable pole and said second contact of said manually controlled switch, said second electrical control means, the movable pole and said second stationary contact of said main cooling control switch and the battery of the motor vehicle whereby said second electrical control means is momentarily energized by said battery to move the movable pole of said main control switch to its stable non-cooling "off" position when the movable pole of said manually controlled switch is engaged with said second contact thereof.

5. In a motor vehicle having a passenger-containing portion and a battery, air cooling apparatus for the passenger-containing portion of the vehicle including temperature responsive control means having an operating and a non-operating condition, a control element having two stable positions, one wherein said cooling apparatus is in an operating cooling condition and another wherein said cooling apparatus is in an inoperative, non-cooling condition, separate control means including at least one pair of solenoids for said air cooling apparatus connected to said battery, one of said solenoids when momentarily energized by said battery operating said control element to said one position and another of said solenoids when momentarily energized by said battery operating said control element to said another position, and circuit means including a snap switch having two stable positions, one of which permits said one of said solenoids to be energized and the other of which permits said another of said solenoids to be energized, said snap switch being coupled to said control element wherein the two move together to effect interruption of the energization of the currently energized said one of said solenoids when the control element has moved to its new position and prepares said another of said solenoids for energization.

References Cited by the Examiner

UNITED STATES PATENTS

| | | | |
|---|---|---|---|
| 2,783,622 | 3/1957 | Bourassa | 62—238 |
| 2,953,907 | 9/1960 | Cicco et al. | 62—148 |
| 3,008,303 | 11/1961 | Ruse et al. | 62—238 |
| 3,055,187 | 9/1962 | Rogers | 62—238 |
| 3,153,441 | 10/1964 | Pippert et al. | 62—238 X |

ROBERT A. O'LEARY, *Primary Examiner.*

LLOYD L. KING, *Examiner.*

MEYER PERLIN, *Assistant Examiner.*